(12) United States Patent
Schultz et al.

(10) Patent No.: US 11,727,697 B2
(45) Date of Patent: *Aug. 15, 2023

(54) OBJECT DETECTION AND IMAGE CLASSIFICATION BASED OPTICAL CHARACTER RECOGNITION

(71) Applicant: salesforce.com, inc., San Francisco, CA (US)

(72) Inventors: Dennis Schultz, St. Louis, MO (US); Daniel Thomas Harrison, Newmarket (CA); Christopher Anthony Kemp, Toronto (CA); Michael A. Salem, Dallas, TX (US)

(73) Assignee: Salesforce, Inc., San Francisco, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/364,343

(22) Filed: Jun. 30, 2021

(65) Prior Publication Data

US 2021/0326589 A1    Oct. 21, 2021

Related U.S. Application Data

(63) Continuation of application No. 16/773,813, filed on Jan. 27, 2020, now Pat. No. 11,100,319.

(51) Int. Cl.
*G06V 20/62* (2022.01)
*G06V 30/413* (2022.01)
*G06V 30/19* (2022.01)
*G06V 30/10* (2022.01)

(52) U.S. Cl.
CPC ........ *G06V 20/63* (2022.01); *G06V 30/19173* (2022.01); *G06V 30/413* (2022.01); *G06V 30/10* (2022.01)

(58) Field of Classification Search
CPC .... G06V 30/413; G06V 10/225; G06V 30/10; G06V 30/19173; G06V 20/63
USPC ........................................................ 382/229
See application file for complete search history.

(56) References Cited

U.S. PATENT DOCUMENTS

| | | | |
|---|---|---|---|
| 11,100,319 B2 * | 8/2021 | Schultz | ............... G06V 30/413 |
| 2012/0301032 A1 | 11/2012 | Kawanishi et al. | |
| 2017/0132866 A1 | 5/2017 | Kuklinski et al. | |

* cited by examiner

*Primary Examiner* — Ayodeji O Ayotunde
(74) *Attorney, Agent, or Firm* — Fenwick & West LLP

(57) ABSTRACT

A system performs optical character recognition (OCR) on an image displaying a portion of an object. An image classification system identifies the object in the image, based on which one or more object detection models identify labels associated with the object within the image. The system determines text of the identified labels using OCR, and analyzes the OCR resultant text for discrepancies and/or inaccuracies. In response to identifying a discrepancy, the system provides a recommendation for improving the accuracy of the OCR resultant text.

20 Claims, 6 Drawing Sheets

OBJECT DETECTION AND IMAGE CLASSIFICATION BASED OPTICAL CHARACTER RECOGNITION

CROSS REFERENCE TO RELATED APPLICATIONS

This application is a continuation of co-pending U.S. application Ser. No. 16/773,813, filed Jan. 27, 2020, which is herein incorporated in its entirety by reference.

BACKGROUND

Field of Art

The disclosure relates to machine learning based techniques for optical character recognition, and in particular to guiding optical character recognition based on object detection and image classification models.

Description of the Related Art

Conventional optical character recognition (OCR) techniques process an image displaying text data to recognize the text data. Accordingly, these techniques convert an image of a document or a label to a digital representation of the text. Conventional techniques perform OCR by assessing how similar an image of a character looks to characters of a language. OCR techniques may be supplemented by user input specifying locations of text fields in each image, the user input defining where specific types of data are expected to be found. Accordingly, conventional OCR techniques are restricted to environments allowing user input, and often lead to inaccurate results.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A method and system for improving the accuracy of textual data determined by optical character recognition (OCR) techniques is disclosed. An online system receives, from a client device, an image displaying a portion of an object. The image includes one or more labels tagging the portion of that object. The online system accesses an image classification model that determines a type of the object found in the received image, based on the labels found in the image of the object. The online system accesses object detection models for the determined object type. For each accessed object detection model, the online system provides the received image as input to the object detection model to detect a label in the received image. The online system determines, using OCR, the text of each detected label, accesses expected phrase types for a type of the label, and analyzes the text to identify discrepancies between the expected phrase types and the OCR determined text. The online system sends a recommendation for improving the accuracy of the text of the label determined using optical character recognition, upon identifying a discrepancy in the text of the label.

Contextualizing text predictions in this way improves the accuracy of results as opposed to conventional OCR techniques, which merely base predictions on how similarly images of text look to language characters and document zones that suggest text can be found at certain coordinates of the image.

To further improve the accuracy of results, the system identifies multiple overlapping zones in the image of the object, uses OCR to predict text for each of the zones, and compares the predicted text values in each of the zones against one another. Accordingly, the system checks for discrepancies between the OCR predicted text results in overlapping zones.

In some embodiments, a computer readable non-transitory storage medium stores instructions for executing the steps described above. In some embodiments, a computer implemented system comprising a computer processor and a computer readable non-transitory storage medium storing instructions that, when executed by the processor, perform the steps described above.

System Environment

Figure 1:
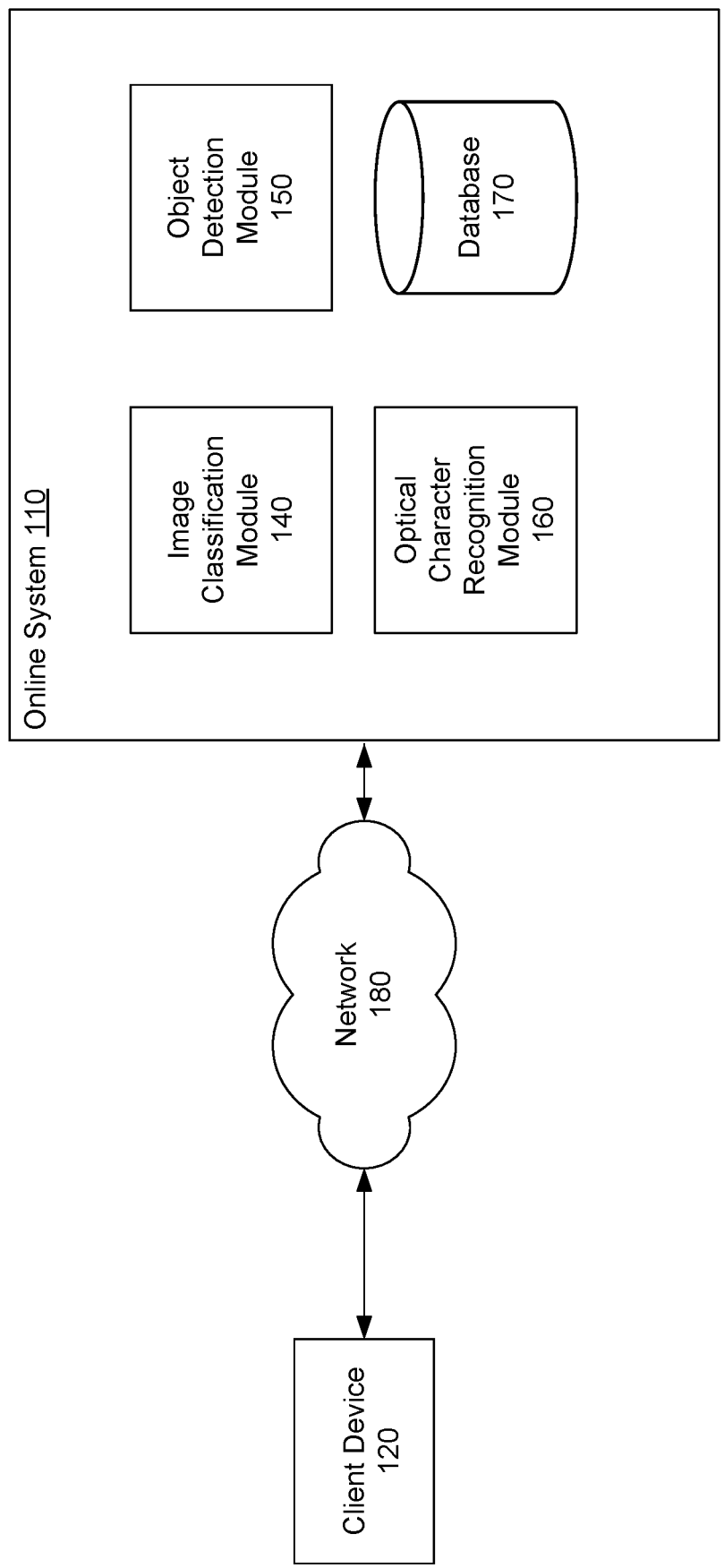
FIG. 1 shows an overall system environment illustrating an online system that performs optical character recognition (OCR) on images received from a client device, in accordance with one or more embodiments.

FIG. 1 shows an overall system environment illustrating an online system 110 that performs optical character recognition (OCR) on images received from a client device 120, in accordance with one or more embodiments. The system environment includes an online system 110, one or more client devices 120, and a network 180. Other embodiments may use more or less or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

A client device 120 is used by users to interact with the online system 110. The client device 120 provides the online system 110 with an image of an object (and/or a portion of an object) that includes text. In some embodiments, the client device 120 captures the image and/or a video of the object with a camera. A user may capture the image of the object using the client device 120. In some embodiments, the client device 120 is a component of a system that automatically captures the image and/or video of the object. In other embodiments, the client device 120 receives the image of the object from another client device. The client device 120 may receive and/or capture a plurality of images of the object. The client device 120 interacts with the online system 110 using a client application on the client device 120. An example of a client application is a browser application. In an embodiment, the client application interacts with the online system 110 using HTTP requests sent over network 180.

The online system 110 identifies text in the image of the object by performing OCR. The online system 110 include an image classification module 140, an object detection module 150, an optical character recognition module 160, and a database 170.

The image classification module 140 classifies the object in the image. After receiving the image including the object from the client device 120, the image classification module 140 uses an image classifier to indicate a type of the object.

The image classification module 140 applies machine learning techniques to generate the classifier. The classifier is trained on images included in a positive training set and in a negative training set. For a given object, the positive training set includes images with the object, whereas the negative training set includes images without the object. The image classification module 140 extracts feature values from the images in the positive and negative training sets, the features being variables deemed potentially relevant to whether or not the images have the associated object. Features may include colors, edges, and textures within the image and are represented by feature vectors.

The image classification module 140 uses supervised machine learning to train the classifier, with feature vectors of the positive and negative training sets serving as inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The trained classifier, when applied to the image provided by the client device 120, extracts one or more feature vectors of the input image and after a comparison of the feature vectors of the input image and the training set, outputs a probability that the object in the image is of a certain type. The identified object is stored in the database 170, and/or provided to the object detection module 150.

For example, the client device 120 may provide the online system 110 with an image of a container of a particular type, for example, a cereal box. The image classification module 140 applies the trained classifier to the input image, which identifies features within the image as corresponding to those in the positive training set associated with containers. For example, the positive training set may include images with containers, for which the feature vectors are similar to that of the input image. The image classification module 140 accordingly identifies the object in the image as a container of a particular type.

The object detection module 150 identifies labels in the image of the object. The labels, on and/or attached to the object, may include text. The object detection module 150 accesses one or more object detection models based on the object identified within the image (e.g., by the image classification module 140). The object detection models identify labels specific to each identified type of object, as well as locations of the labels within the image of the object.

Continuing with the container example described above, assuming that the container represents a cereal box, the image classification module 140 communicates to the object detection module 150 that the type of object found in the input image is a cereal box. The object detection module 150 accesses object detection models specific for cereal boxes, which identify and locate labels within the image that are specific to cereal boxes, such as nutrition information, name of the cereal, and brand information, among others. The detailed description of FIG. 2 describes the object detection module 150 in further detail.

The optical character recognition (OCR) module 160 performs OCR on the labels found in the image of the object. Accordingly, the OCR module 160 converts images of text in the labels into machine-readable text (e.g., such that the text can be input into a word processor). In some embodiments, the OCR module 160 checks the text for discrepancies from what is expected for the type of object and labels identified by the image classification module 140 and the object detection module 150, respectively. In doing so, the OCR module 160 improves the accuracy of OCR determined text results. In some embodiments, the OCR module 160 performs these checks for discrepancies by named entity recognition (NER). If discrepancies are found, the OCR module 160 may prompt a user of the online system 110 to recapture the image including the object and/or attempt to resolve the discrepancy by performing more OCR.

For example, after performing OCR on the labels found in the image of the above-mentioned cereal box, the OCR module 160 compares against expected text values for each of the identified labels. The OCR module 160 may check for the character "g," indicating grams, in a nutrition label converted to text by OCR. The detailed description of FIG. 2 describes the object detection module 150 in further detail.

The database 170 stores information relevant to the online system 110. The database 170 stores, for example, the image of the object, the positive and negative training sets, feature vectors of the positive and negative training sets, the object detection models, and expected label types and/or contents (e.g., text, images, characters) for detected objects, among others.

The online system 110 and the client device 120 communicate over the network 180, which may be, for example, the Internet. In one embodiment, the network 180 uses standard communications technologies and/or protocols. In another embodiment, the network 180 comprises custom and/or dedicated data communications technologies instead of, or in addition to, the ones described above. The techniques disclosed herein can be used with any type of communication technology, so long as the communication technology supports the transmission of data from the client device 120 to the online system 110, and vice versa.

Object Detection and Optical Character Recognition

Figure 2:
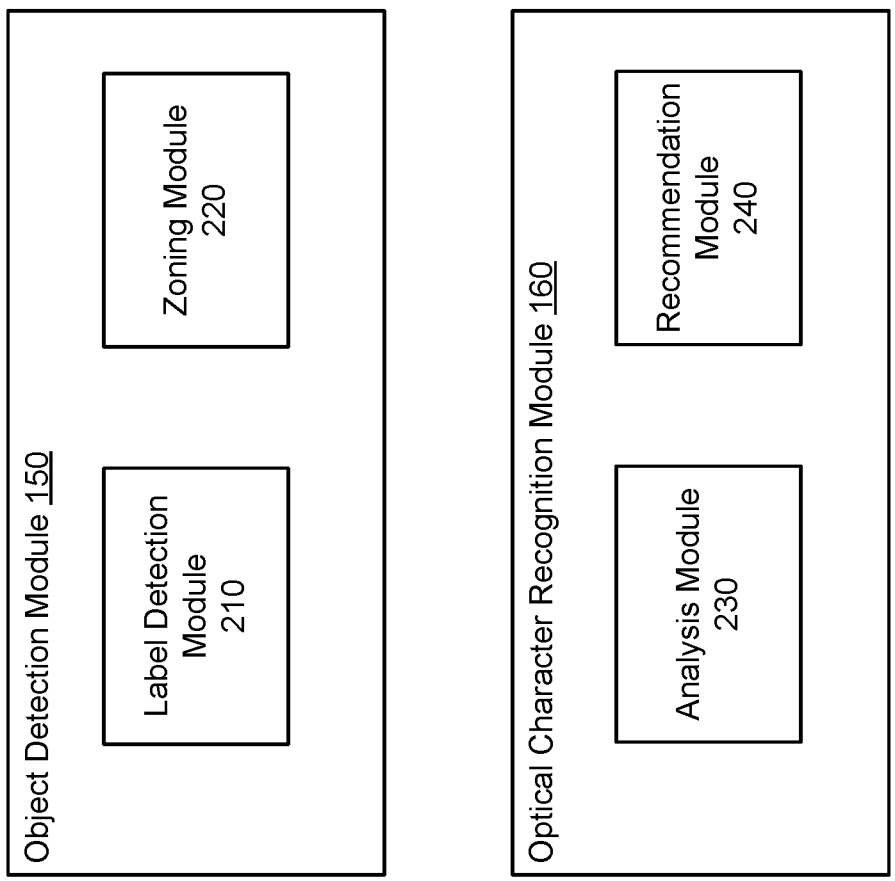
FIG. 2 shows system architectures of an object detection module and an OCR module, in accordance with one or more embodiments.

FIG. 2 shows system architectures of the object detection module 150 and the OCR module 160, in accordance with one or more embodiments. The object detection module 150 includes a label detection module 210 and a zoning module 220. The OCR module 160 includes an analysis module 230 and a recommendation module 240. The object detection module 150 and/or the OCR module 160 may include other modules than those described herein. In some embodiments, the object detection module 150 and/or the OCR module 160 are integrated into the online system 110 of FIG. 1. In other embodiments, the object detection module 150 and/or the OCR module 160 are separate from, but communicate with, the online system 110.

The object detection module 150 identifies and locates labels within an image of an object. As described with respect to FIG. 1, the client device 120 captures and provides an image including an object to the online system 110. The image classification module 140 uses an image classifier to identify the object within the image. The object detection module 150 then identifies labels associated with the type of object in the image. The object detection module 150 includes the label detection module 210 and the zoning module 220.

The label detection module 210 identifies one or more labels within the image of the object. The label detection module 210 uses object detection models that are specific to the type of object identified in the image. The object detection models are configured to detect and locate multiple classes of labels for each identified object. For example, object detection models for a machine (e.g., the identified object) in the image may be able to identify a warning label, an instructions label, an emergency contact label, a maintenance label, and so on. A bounding box indicates a location of each label within the image.

Figure 3:
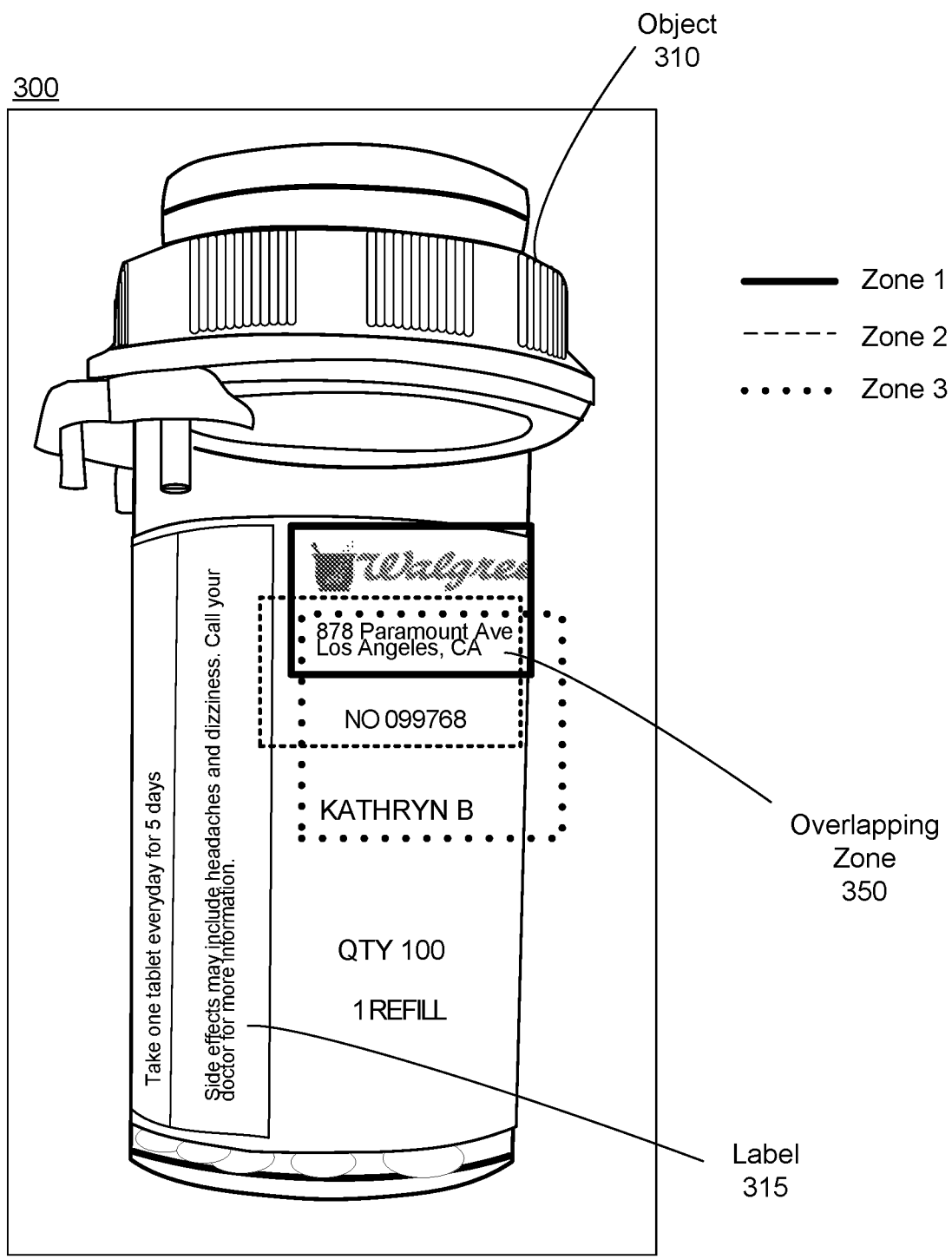
FIG. 3 shows an example image of an object with a plurality of identified zones, in accordance with one or more embodiments.

The zoning module 220 identifies zones within the image that include the identified labels. After the label detection module 210 identifies and locates each of the labels within the image, the zoning module 220 may identify a plurality of zones within the image, each zone including at least one label. In some embodiments, a subset of the plurality of zones overlap. The zoning module 220 determines a size of each of the zones, creates multiple copies of the image, and crops each copy of the image to represent a zone of the image. Accordingly, the zoning module 220 ensures that each label appears in a plurality of copies of images. FIG. 3 provides an example of an image of an object with a plurality of zones.

The optical character recognition (OCR) module 160 performs OCR to determine the text of labels identified by the object detection module 150. The OCR module 160 performs OCR on each copy of the overlapping zones identified by the zoning module 220, thus producing multiple OCR text results for every label in the image. The OCR module 160 includes the analysis module 230 and the recommendation module 240.

The analysis module 230 evaluates the accuracy of the OCR text results. As described above, the zoning module 220 identifies one or more zones within the image of the object, each zone including at least one label. The analysis module 230 performs OCR on each zone, thereby predicting a value of text within each zone, and compares the results. In response to identifying a difference in the predicted text for the label found in the overlapping portion of both zones, the analysis module 230 takes the highest occurrence of a predicted text value as the accurate OCR result. Suppose three zones overlapped at the nutrition label of the cereal box used in the example above, and OCR results for two zones found a line to read "600 mg" but the OCR results for the third zone found the same line to read "GOO mg." The analysis module 230 determines that the highest occurring predicted text for that line, in this case "600 mg," to be the most accurate, actual value of text.

In some embodiments, the analysis module 230 forms a tiebreaker zone to determine the most accurate value of text. A number of predicted text values may have the highest occurrence; for example, after performing OCR on four overlapping zones, the results for two zones may read "600 mg" and the results for the other two zones may read "GOO mg." To form the tiebreaker zone, the analysis module 230 instructs the zoning module 220 to combine at least two of the multiple zones. OCR is then performed on the tiebreaker zone, and the OCR results of the tiebreaker zone are deemed to be the most accurate value of the text.

The analysis module 230 also improves the accuracy of the OCR text results by checking against expected values for each of the identified labels. The analysis module 230 accesses an expected phrase type and/or value for each label. For example, if the object detection module 150 identifies a label as a nutrition label, the analysis module 230 accesses expected phrase types and/or values for nutrition labels, which may include a nutrient accompanied by a weight and/or a percentage (e.g., sodium—50 mg, vitamin A—4%). The analysis module 230 checks for discrepancies between the OCR resultant text and the expected phrase type and/or value. In some embodiments, the analysis module 230 makes use of named entity recognition (NER) predictions to determine an expected phrase type and/or value. The analysis module 230 may receive an input text string and perform NER to determine types of different portions of the text. For example, NER may determine that a portion of text represents a user's name and another portion of text represents an address. NER may determine various properties of the text, for example, ranges of values, types of characters that are expected, and so on. For example, if the analysis module 230 determines that a text represents a user's proper name, the analysis module 230 infers that there are only alphabetic characters in the name and numeric characters are not expected. Accordingly, the analysis module 230 may map an image to the closest alphabetic character even though a numeric character may have closer match to the image. Discrepancies may reveal that the object detection module 150 incorrectly identified a label. For example, the analysis module 230 may find a discrepancy after comparing an OCR result of only text to an expected phrase type appropriate for a nutrition label. The object detection module 150 may have mistaken a recipe label for a nutrition label.

In other embodiments, discrepancies may reveal that the OCR results are inaccurate. The analysis module 230 may find a discrepancy between an expected data type and the OCR resultant data type (e.g., text instead of an integer). For example, the OCR result text may read GOO, as opposed to the expected integer 600. If no discrepancies are found, the analysis module 230 deems the OCR results as accurate. In some embodiments, the OCR results are presented to the user of the online system 110 via the client device 120 and/or are used by the online system 110 for various applications.

The recommendation module 240 generates recommendations for a user of the online system 110 to improve the accuracy of the text determined by OCR. In some embodiments, the recommendations cause the OCR module 160 to perform additional OCR techniques on the image. In some embodiments, in response to identifying a discrepancy between the expected text and the resultant OCR text and/or forming multiple tiebreaker zones, the OCR module 160 provides the user with recommendations to improve the quality of a recaptured image. In some embodiments, the OCR module 160 determines that even the predicted value of text determined from the OCR results of the tiebreaker zone are not accurate, and thus provides the user with recommendations. The recommendations may prompt the user to provide a new image with better conditions and/or alter the object that is being captured in the image. For example, the recommendations may suggest the user moves closer to the object, places the object in better lighting, removes dirt and/or debris, and so on. In some embodiments, the recommendation module 240 causes the online system 110 to automatically process the image to improve exposure settings on the image, including brightness, contrast, and/or sharpness. The OCR module 160 may perform another round of OCR after the user and/or online system 110 provides an improved image. The recommendation module 240 provides recommendations via the client device 120 and/or the online system 110.

Example Image for Object Detection and Image Classification Guided Optical Character Recognition FIG. 3 shows an example image 300 of an object 310 with a plurality of identified zones 1, 2, and 3, in accordance with one or more embodiments. The client device 120 captures the image 300 of the object 310. The client device provides the image 300 to the online system 110.

The image classification module 140, of the online system 110, applies an image classifier to the image 300 and identifies the object 310 as a prescription pill bottle. The object detection module 150 applies object detection models specific to medicines and/or prescriptions to the image 300. The label detection module 210 then identifies and locates a plurality of labels on and/or around the object 310 within the image 300. For example, the label detection module 210 identifies the label 315 as describing side effects. Other examples of identified labels for the prescription pill bottle include a patient name label, pharmacy name label, a pharmacy address label, a prescription identifier label, an instructions label, and so on. The zoning module 220 identifies a plurality of zones, 1, 2, and 3, within the image 300, designating each label to at least one zone. In particular, zone 1 encompasses the pharmacy name label and the pharmacy address label, zone 2 encompasses the pharmacy address label and the prescription identifier label, and zone 3 encompasses the pharmacy address label, the prescription identifier label, and the patient name label. Note the different sizes of the zones 1, 2, and 3. The zoning module 220 makes several copies of the image 300, crops each copy according to one of the zones 1, 2, and 3, and accordingly ensures that the text labels are present in a number of the images. In FIG. 3, the pharmacy address label appears in and overlaps across all three zones, rendering it the overlapping zone 350.

The OCR module 160 performs OCR on each of the cropped copies of the image 300, producing OCR text results for each of the zones 1, 2, and 3. To determine the most accurate OCR text result for the overlapping zone 350, the analysis module 230 determines a predicted text value with the highest occurrence. For example, predicted text results for the overlapping zone 350 after performing OCR on zone 1 may read "878 Baramount Ave Los Angeles, O. Predicted text results after performing OCR on zones 2 and 3 may yield "878 Paramount Ave Los Angeles, Calif.," which then becomes the predicted text value of the highest occurrences. The analysis module 230 therefore determines that this predicted text value is the most accurate. In some embodiments, the analysis module 230 may perform OCR on a tiebreaker zone, combining the zones 1, 2, and 3, to determine the most accurate predicted text value. The recommendation module 250 provides recommendations to the user on improving the accuracy of the predicted text results.

Figure 4:
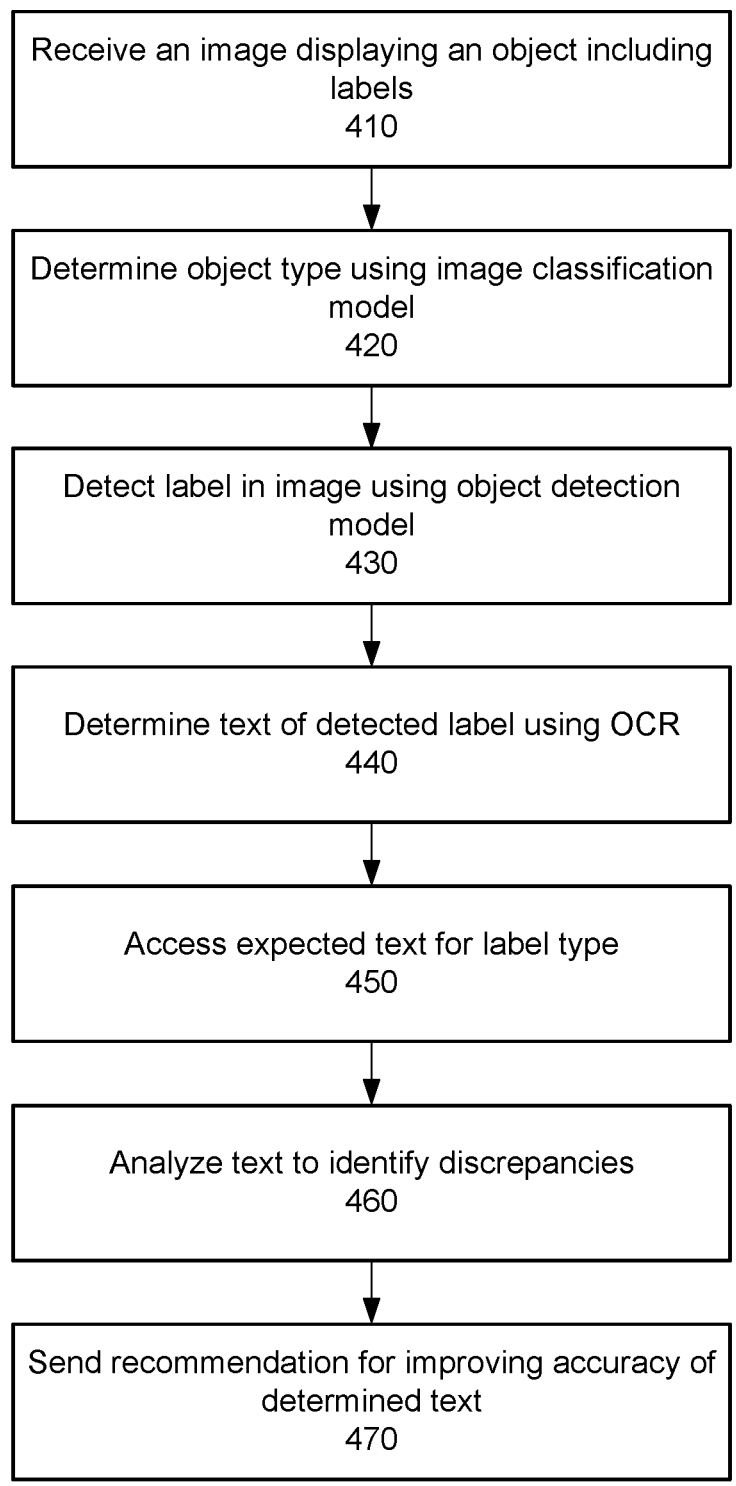
FIG. 4 shows a process for object detection and image classification based OCR, in accordance with one or more embodiments.

FIG. 4 shows a process for object detection and image classification based OCR, in accordance with one or more embodiments. An online system (e.g., the online system 110) receives 410 an image (e.g., the image 300 captured by the client device 120) displaying an object (e.g., the object 310) including labels (e.g., the label 315).

The online system determines 420 a type of the object within the image. To determine the object type, the online system accesses an image classification model configured to receive an input image displaying a portion of an object and determine an object type of the object, and applies the image classification model to the input image.

The online system detects 430 a label in the image using one or more object detection models. The object detection models are configured to receive an image as input and identify types of labels that may be associated with the type of object found in the image.

The online system determines 440 text of the detected label using optical character recognition.

For the label identified in the input image, the online system accesses 450 an expected text for the type of label. Expected text may include phrase types, content, and/or data types, determined from named entity recognition techniques.

The online system analyzes 460 the OCR determined text for accuracy. In one embodiment, the online system compares the expected text and the OCR resultant text for discrepancies. Accordingly, the online system identifies errors with the object detection models and/or the optical character recognition techniques.

In response to finding discrepancies, the online system sends 470 recommendations to a user of the online system for improving the accuracy of the text determined by OCR. The recommendations include, for example, recapturing the image of the object and pre-processing the image prior to performing OCR. In some embodiments, the recommendations include performing OCR on the image again. In other embodiments, the online system recommends additional OCR techniques to improve the accuracy of the OCR resultant text.

Figure 5:
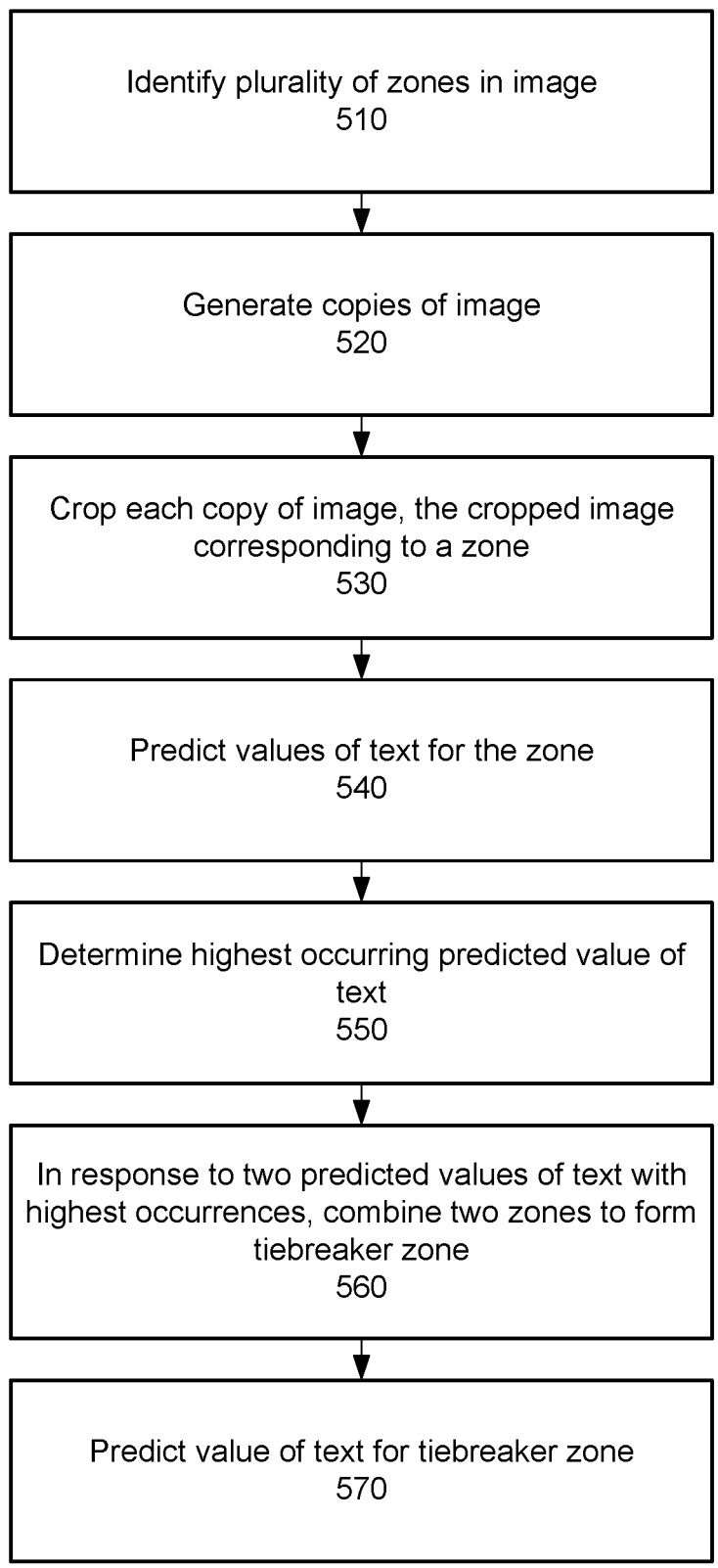
FIG. 5 shows a process for improving the accuracy of textual data determined by OCR, in accordance with one or more embodiments.

FIG. 5 shows a process for improving the accuracy of textual data determined by OCR, in accordance with one or more embodiments. The online system (e.g., as described in the description of FIG. 4), identifies 510 a plurality of zones in the image of the object. Each zone includes at least one label comprising text. In some embodiments, many zones overlap, where the overlapped portion includes a label.

The online system generates 520 copies of the image.

The online system crops 530 each copy of the image such that each cropped image corresponds to a zone.

The online system predicts 540 text values, by OCR, for the zone in each cropped image.

The online system determines 550 the predicted text with the highest number of occurrences across multiple OCR results for a label. The multiple OCR text results are from OCR performed across multiple zones overlapping at the label.

The online system combines 560 two zones to form a tiebreaker zone, in response to two predicted values of text with the highest occurrences. The tiebreaker zone comprises a combination of multiple zones to include the label for which text is being predicted.

The online system predicts 570 the text value for the tiebreaker zone by performing OCR. If the OCR resultant text is still inaccurate, the online system prompts the user to capture a new image of the object to ensure better image conditions.

Computing Machine Architecture

Figure 6:
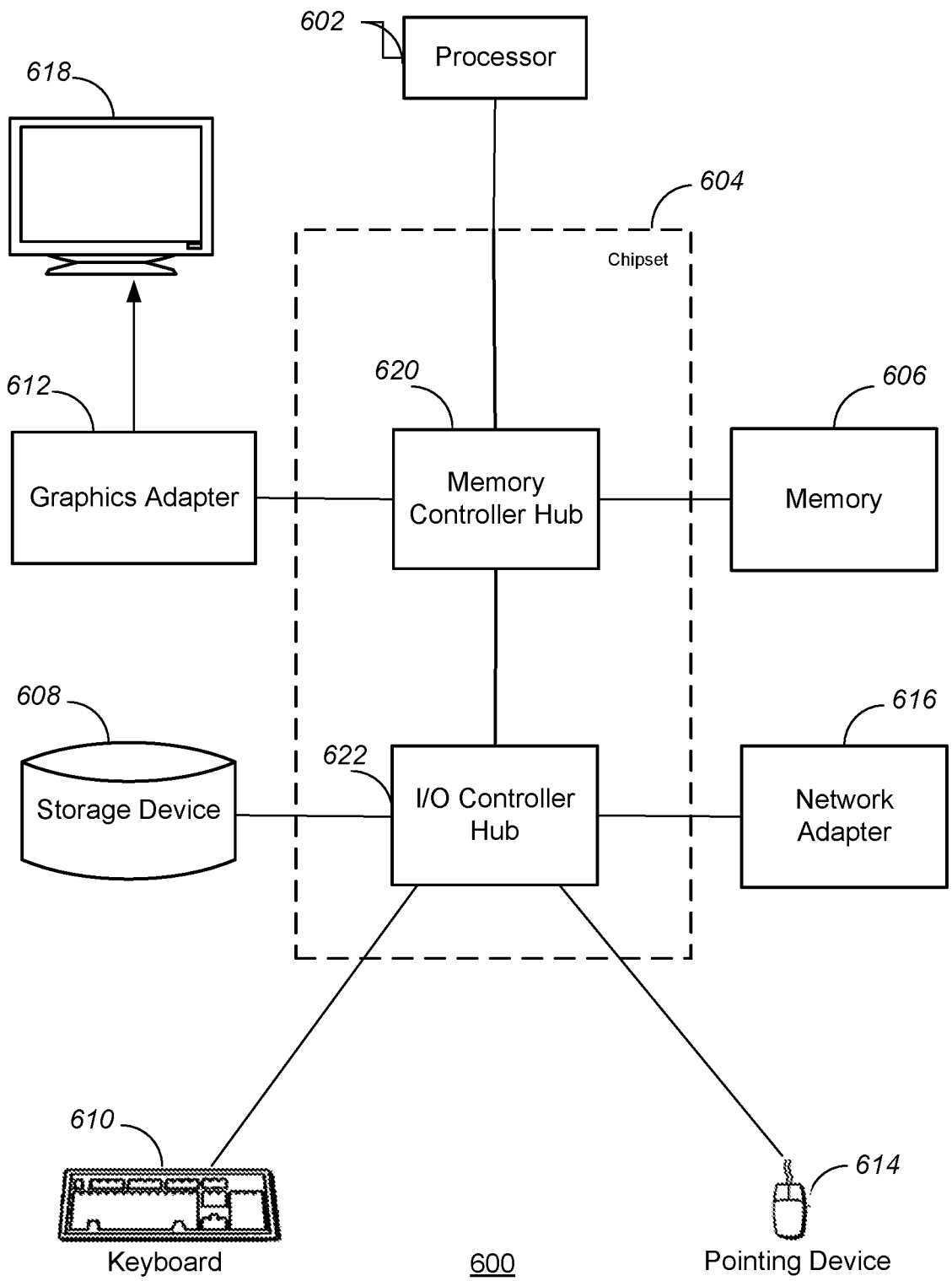
FIG. 6 shows a block diagram including components of an example machine able to read instructions from a machine-readable medium and execute them in a processor (or controller).

FIG. 6 illustrates a block diagram including components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 406, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for improving the accuracy of optical character recognition through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for optical character recognition, comprising:
   receiving an image displaying one or more labels;
   detecting the one or more labels by providing the image as input to one or more object detection models, wherein an object detection model is configured to identify a label of a label type in an input image;
   for a detected label in the image:
      determining a text of the detected label using optical character recognition;
      accessing expected phrase types for phrases of a label type of the detected label;
      analyzing the text based on an expected phrase type to identify discrepancies in the text;
   responsive to identifying a discrepancy in a text of a particular label, sending a recommendation for improving the image.

2. The computer implemented method of claim 1, further comprising:
   identifying a plurality of zones of the received image;
   for a zone from the plurality of zones, predicting a value of the text; and
   responsive to identifying differences in predicted values of the text, using a predicted value of the text having the highest number of occurrences as the value of the text.

3. The computer implemented method of claim 2, the method further comprising:
   responsive to determining that two predicted values of the text have the highest number of occurrences, combining at least two of the plurality of zones to obtain a tiebreaker zone; and
   determining the value of the text to be a predicted value of the text for the tiebreaker zone.

4. The computer implemented method of claim 3, the method further comprising:
   determining a size of a zone from the plurality of zones;
   creating multiple copies of the image;
   cropping each copy of the image to obtain cropped images such that each cropped image corresponds to a zone; and
   predicting text values for the zone corresponding to each cropped image.

5. The computer implemented method of claim 3, the method further comprising:
   responsive to determining that the value of the text is not the predicted value of the text for the tiebreaker zone, generating the recommendation for improving an accuracy of the text of the label determined using optical character recognition.

6. The computer implemented method of claim 5, wherein the recommendation comprises capturing a new image.

7. The computer implemented method of claim 1, wherein identifying a discrepancy in a text comprises determining that an expected data type of a value in the expected phrase type fails to match an actual data type of the value in the text.

8. The computer implemented method of claim 1, wherein identifying a discrepancy in a text comprises comparing a value in the text against a predetermined list of expected values for the text.

9. A computer readable non-transitory storage medium storing instructions that when executed by a computer processor, cause the computer processor to perform steps comprising:
   receiving an image displaying one or more labels;
   detecting the one or more labels by providing the image as input to one or more object detection models, wherein an object detection model is configured to identify a label of a label type in an input image;
   for a detected label in the image:
      determining a text of the detected label using optical character recognition;
      accessing expected phrase types for phrases of a label type of the detected label;
      analyzing the text based on an expected phrase type to identify discrepancies in the text;
   responsive to identifying a discrepancy in a text of a particular label, sending a recommendation for improving the image.

10. The computer readable non-transitory storage medium of claim 9, wherein the instructions cause the computer processor to perform steps comprising:
    identifying a plurality of zones of the image;
    for a zone from the plurality of zones, predicting a value of the text; and
    responsive to identifying differences in predicted values of the text, using a predicted value of the text having the highest number of occurrences as the value of the text.

11. The computer readable non-transitory storage medium of claim 10, wherein the instructions cause the computer processor to perform steps comprising:
responsive to determining that two predicted values of the text have the highest number of occurrences, combining at least two of the plurality of zones to obtain a tiebreaker zone; and
determining the value of the text to be a predicted value of the text for the tiebreaker zone.

12. The computer readable non-transitory storage medium of claim 11, wherein the instructions cause the computer processor to perform steps comprising:
determining a size of a zone from the plurality of zones;
creating multiple copies of the image;
cropping each copy of the image to obtain cropped images such that each cropped image corresponds to a zone; and
predicting text values for the zone corresponding to each cropped image.

13. The computer readable non-transitory storage medium of claim 11, wherein the instructions cause the computer processor to perform steps comprising:
responsive to determining that the value of the text is not the predicted value of the text for the tiebreaker zone, generating the recommendation for improving an accuracy of the text of the label determined using optical character recognition.

14. The computer readable non-transitory storage medium of claim 13, wherein the recommendation comprises capturing a new image.

15. The computer readable non-transitory storage medium of claim 9, wherein identifying a discrepancy in a text comprises determining that an expected data type of a value in the expected phrase type fails to match an actual data type of the value in the text.

16. The computer readable non-transitory storage medium of claim 9, wherein identifying a discrepancy in a text comprises comparing a value in the text against a predetermined list of expected values for the text.

17. A computer system comprising:
a computer processor; and
a computer readable non-transitory storage medium storing instructions that when executed by the computer processor, cause the computer processor to perform steps comprising:
receiving an image displaying one or more labels;
detecting the one or more labels by providing the image as input to one or more object detection models, wherein an object detection model is configured to identify a label of a label type in an input image;
for a detected label in the image:
determining a text of the detected label using optical character recognition;
accessing expected phrase types for phrases of a label type of the detected label;
analyzing the text based on an expected phrase type to identify discrepancies in the text;
responsive to identifying a discrepancy in a text of a particular label, sending a recommendation for improving the image.

18. The computer system of claim 17, wherein the instructions cause the computer processor to perform steps comprising:
identifying a plurality of zones of the image;
for a zone from the plurality of zones, predicting a value of the text; and
responsive to identifying differences in predicted values of the text, using a predicted value of the text having the highest number of occurrences as the value of the text.

19. The computer system of claim 18, wherein the instructions cause the computer processor to perform steps comprising:
responsive to determining that two predicted values of the text have the highest number of occurrences, combining at least two of the plurality of zones to obtain a tiebreaker zone; and
determining the value of the text to be a predicted value of the text for the tiebreaker zone.

20. The computer system of claim 19, wherein the instructions cause the computer processor to perform steps comprising:
determining a size of a zone from the plurality of zones;
creating multiple copies of the image;
cropping each copy of the image to obtain cropped images such that each cropped image corresponds to a zone; and
predicting text values for the zone corresponding to each cropped image.

* * * * *